Figures 3, 4:
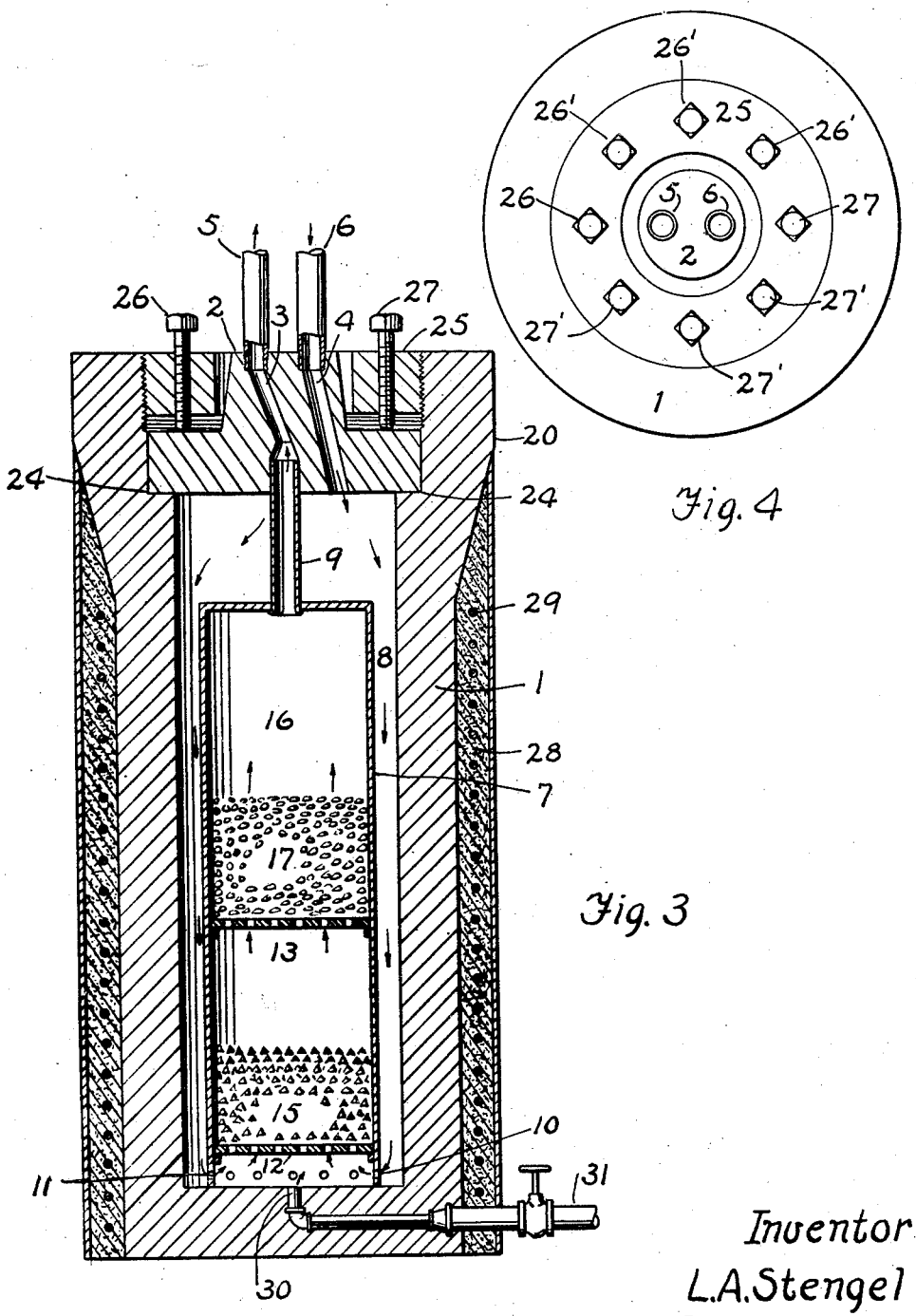

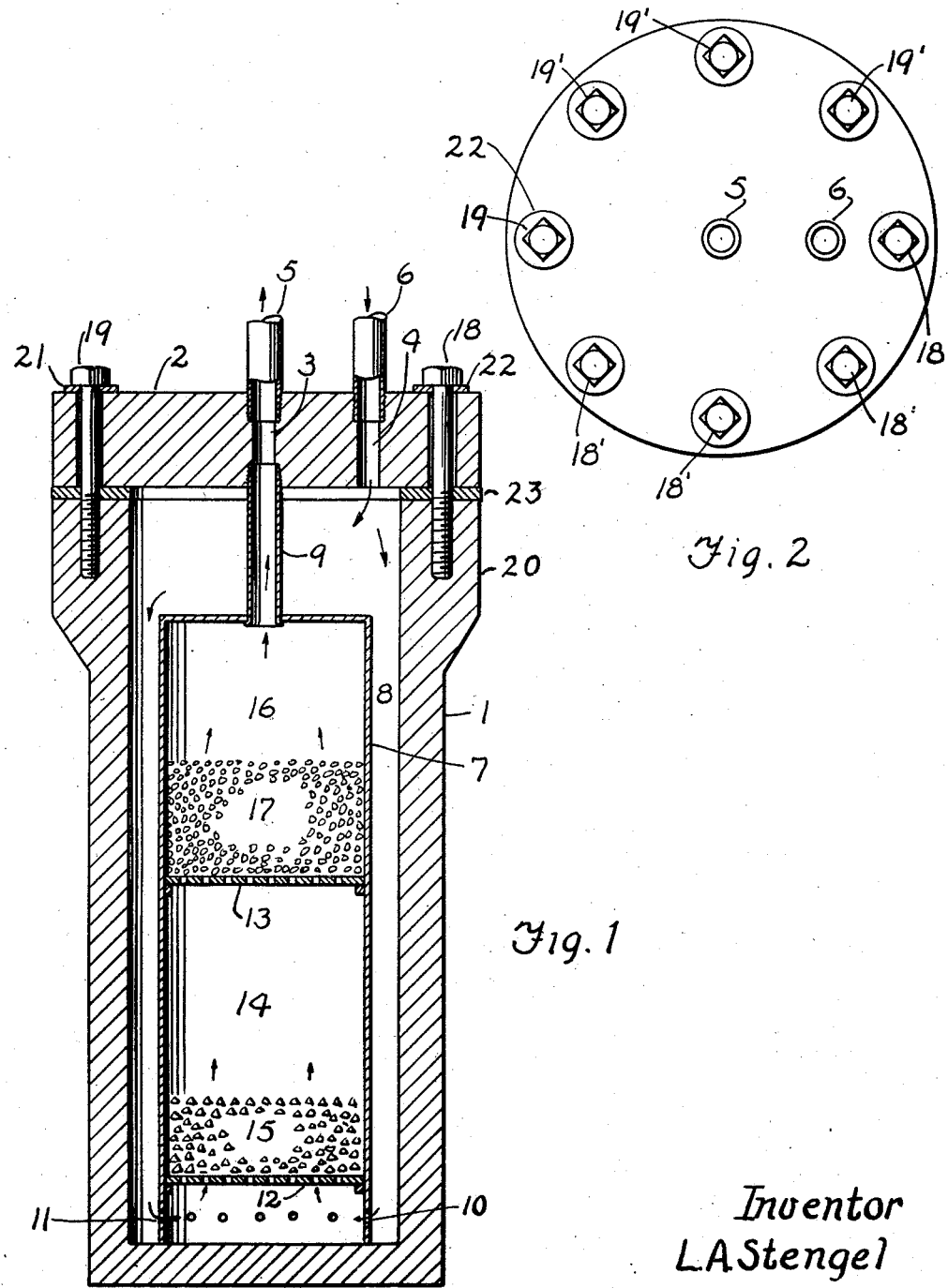

April 28, 1931. L. A. STENGEL 1,803,306
CATALYTIC APPARATUS
Filed Jan. 8, 1927   2 Sheets-Sheet 2

Inventor
L.A.Stengel
By Bruce.K.Brown
Atty

Patented Apr. 28, 1931

1,803,306

UNITED STATES PATENT OFFICE

LEONARD A. STENGEL, OF TERRE HAUTE, INDIANA, ASSIGNOR TO COMMERCIAL SOLVENTS CORPORATION, OF TERRE HAUTE, INDIANA, A CORPORATION OF MARYLAND

CATALYTIC APPARATUS

Application filed January 8, 1927. Serial No. 159,888.

The present invention relates to an improved type of apparatus for use in the production of liquid organic products, such as alcohols, by the catalytic reaction of carbon oxides and hydrogen under the influence of elevated temperature and pressure.

It is now well known that carbon oxides and hydrogen may be reacted in the above-described manner to produce methanol, propanol, isobutanol, etc.; and that the product obtained depends largely on the catalyst employed and on the reaction conditions maintained. Similarly other gases such as methane, ethylene, or alcohol vapors may be employed as reactants and the products obtained from the synthesis may be varied through a wide range.

The present invention pertains specifically to an apparatus or "converter bomb" in which these reactions may be efficiently brought about. In the drawings forming a part of this specification, Figure 1 represents a central vertical cross section of my device, and Figure 3 is a similar view of a modified form of the same apparatus. Figures 2 and 4 are top views of Figures 1 and 3, respectively.

According to the present invention I have designed an improved converter bomb of a pressure-resistant type which includes, as an integral element, a "pre-catalyst chamber" the temperature of which is sustained by the exothermic character of the catalytic reaction. The invention also includes means for preheating the gases in the converter bomb, and means for the regulation of the reaction temperature.

It is the object of my present invention to provide a converter bomb in combination with a precatalyst chamber whereby the purity of the gases reaching the catalyst may be insured. It is a further object of my invention to supply the heat necessary for the proper operation of the pre-catalyst by placing the supporting chamber for this substances within the converter bomb itself subjacent to the catalyst; whereby the heat of reaction may be employed to maintain the pre-catalyst at proper temperature. Other objects of my invention include the provision of means for the maintenance and control of the reaction temperature within the converter bomb.

My invention may be best understood by reference to Figure 1 and Figure 3 of the accompanying drawings, both of which display my converter bomb in cross-section. Figure 1 represents the most simple type of apparatus, whereas Figure 3 represents an apparatus of an improved form. Insofar as the two apparati are identical, similar numerals have been used for reference purposes. In Figure 1, 1 is a pressure-sustaining vessel, cylindrical in form and having a bottom closure preferably integral with the walls. 2 is a top member or lid closing the top of 1. The lid 2 is perforated at points 3 and 4 to provide entrance and exit ports for the reacting gases. Pressure-sustaining connections to these ports are made on the upper surface of 2 by threaded joints in which the gas exit pipe 5 and the gas entrance pipe 6 are fixed.

Within the pressure-sustaining vessel 1, a cylindrical tube forming catalyst basket 7 is placed. This rests on the bottom of the vessel 1, an annular space 8 remaining between its outer surface and the inner wall of the pressure-resisting vessel. The basket 7 has an integral top and is connected by pipe 9 with the gas exit port 3 in the lid 2.

Near the bottom of basket 7 there is a series of perforations constituting small holes (10 and 11 on the drawing) through which the gas flowing in the annular space 8 may enter the bottom of the basket 7. Within the basket 7 are disposed perforate plates 12 and 13 through which gases may pass as shown on the drawing. The compartment 14, bounded by the plates 12 and 13 and the walls of basket 7, comprises the pre-catalyst chamber 14 in which the pre-catalyst 15 is supported by plate 12. The compartment 16, bounded by the plate 13 and the vessel 1, comprises the catalyst chamber in which the catalyst 17 is supported by perforate plate 13.

In Figure 1 the lid 2 is affixed by means of a plurality of threaded bolts 18, 19, etc., which screw into taps in the top lip 20 of vessel 1. These bolts are used to exert a downward force on lid 2 through the washers 21, 22, etc. A gasket 23 lies between the top of vessel 1 and lid 2. While only two bolts (18 and 19) are shown in Figure 1, Figure 2, shows the plurality of bolts disposed around the circumference of lid 2.

In the operation of the device shown in Figure 1, the catalyst 17 must first be brought up to the required reaction temperature, which is usually 300–400° C. This may be accomplished either by passing hot gases through the apparatus, or by heating the pressure-sustaining vessel, or by a combination of these two methods. When the proper temperature has been attained, the gas mixture to be reacted is admitted under the required pressure through pipe 6 and port 4. In the case of the reaction of a mixture of hydrogen and carbon oxides to produce methanol, the usual operating pressure is 2000–3000 pounds.

The gases entering the bomb 1 through port 4 pass downward through the annular space 8 and enter the bottom of the catalyst basket 7 through ports 10 and 11. The gases then rise upward through perforate plate 12, pre-catalyst 15, and perforate plate 13; whereupon they come in contact with the catalyst 17. The reaction is an exothermic one. The reacted gases then pass out of the bomb 1 through pipe 9, port 3, and pipe 5.

The heat generated by the synthesis maintains the proper reaction temperature in the bomb and consequently also maintains the temperature of the pre-catalyst chamber 14 and pre-catalyst 15. The function of the pre-catalyst is to destroy catalyst poisons; usually by absorbing them. Typical catalyst poisons include metallic carbonyls, sulfur compounds, oil vapors, etc. In the practice of the process, the pre-catalyst may consist of finely divided copper, asbestos, silica, quartz, or mixtures of these substances. A quantity of the same substance, usually a mixture of metallic oxides, that is employed as a catalyst for the reaction may also be used as the pre-catalyst, the poisoning of the latter material preventing the deterioration of the former.

The annular space 8, in which the entering gas comes into thermal contact with the catalyst basket serves two purposes. The constant flow of relatively cool incoming gas down this space serves to regulate the temperature of the catalyst basket. The heat absorbed by the incoming gases is transferred by them to the pre-catalyst, and this transfer helps to maintain the required temperature therein, supplementing the heat absorbed by radiation and conduction.

Figure 3 represents a central vertical section of a modified form of a converter bomb; whereas Figure 4 represents a top view of the same. This latter-illustrated bomb is similar, in general, to the device shown in Figures 1 and 2; and similar reference numerals have been used wherever possible. This latter device however differs from the former in three particulars:—

1. Means of closure of lid 2;
2. Means of heating;
3. Means of temperature regulation through gas input.

In Figure 3, the lid 2 rests free on an internal shoulder 24 of the lip 20 of vessel 1. The lid 2 is kept seated by means of pressure exerted on it by a plurality of bolts in threaded seatings in screw-head 25. Two of these bolts—i. e. 26 and 27 are shown in Figure 3, whereas in Figure 4 a top view is shown which displays a plurality of bolts placed around the circumference of screw-head 25. Screw-head 25 is threaded into the top of the internal wall of the vessel 1.

In Figure 3, 28 is a layer of insulation placed around the outside wall of vessel 1. Imbedded in the insulation is a series of electric heating elements shown in cylindrical cross-section; 29 being a typical member. By the use of these electrical heating elements, heat may be imparted to vessel 1. While the reaction within the bomb is an exothermic one and the required temperature may be maintained largely or entirely by the heat of reaction, the presence of the heating elements not only makes possible the more rapid starting up of the process, but also provides a means of heat control if the temperature of the reaction falls below the optimum.

In Figure 3, 30 is a supplemental gas inlet port drilled in the bottom of the vessel 1, and attached by a threaded tap to a valve-controlled gas supply pipe 31. This supplemental gas inlet port is used in the operation of the apparatus to maintain an accurate control of the temperature within the catalyst basket 7. In normal operation the catalyst temperature frequently may rise above the optimum, due to the exothermic character of reaction.

The incoming gas, whether pre-heated or at normal temperature, picks up heat during its passage down the annular space 8 and reaches the catalyst in a heated condition not conducive to a diminution in catalyst temperature. To diminish the temperature within the catalyst basket, cold gas is added through pipe 31 and port 30 to the bottom of basket 7. There it mingles with the heated gases entering through ports 10, 11, etc. and serves to reduce the temperature. In this manner a very accurate control of the temperature within the basket 7 may be maintained.

In constructing my apparatus I prefer to employ chrome-vanadium steel as the material with which to construct the pressure-sustaining vessel, though other steels and alloys may be substituted. Hot iron or steel is rapidly corroded by the gas employed in the alcohol synthesis—i. e. hydrogen and carbon oxides—and hence it is advisable to place a non-corroding metal sheath or plating within the vessel. Suitable metals for this purpose include copper and chromium. The catalyst basket is preferably constructed of copper, though plated iron baskets may be employed.

Now, having described my invention, I claim the following as new and novel:

1. In an apparatus for the synthesis of liquid organic products, a pressure-sustaining vessel with a removable lid containing inlet and exit gas ports, a tube centrally positioned within, and having its lower rim supported on the bottom of said vessel and forming a catalyst chamber and a subjacent pre-catalyst chamber arranged above said rim, an annular space between said tube and said vessel said space connected with the gas inlet port in said lid, and ports formed in the lower rim of said tube for the admission of gas from the annular space to the bottom of the pre-catalyst chamber, the top of the tube being connected with the gas exit port in said lid.

2. In an apparatus for the synthesis of liquid organic products, a pressure-sustaining vessel with a removable lid containing gas inlet and exit ports, a tube centrally disposed within, and having its lower rim supported on the bottom of said vessel and forming a catalyst chamber and a subjacent pre-catalyst chamber arranged above said rim, an annular space between said tube and said vessel, said annular space being connected with the inlet port and with ports formed in the lower rim of the tube, said tube being connected at the top with the exit port, and a supplementary gas inlet port in the bottom of said vessel connected with the chamber formed by the lower rim below said pre-catalyst chamber.

In testimony whereof I affix my signature.

LEONARD A. STENGEL.